United States Patent [19]

Feinberg

[11] Patent Number: 4,992,486

[45] Date of Patent: Feb. 12, 1991

[54] WHITE-PIGMENTED, MELT-STABLE ETHYLENE/CARBOXYLIC ACID COPOLYMER COMPOSITIONS

[75] Inventor: Stewart C. Feinberg, Exton, Pa.

[73] Assignee: E. I. Du Pont de Nemours and Company, Wilmington, Del.

[21] Appl. No.: 436,467

[22] Filed: Nov. 14, 1989

[51] Int. Cl.$^5$ .............................. C08K 9/10
[52] U.S. Cl. .................... 523/210; 524/515; 524/522; 524/523; 524/528; 525/221
[58] Field of Search ............. 523/210; 524/515, 522, 524/523, 528; 525/221

[56] References Cited

U.S. PATENT DOCUMENTS

| | | | |
|---|---|---|---|
| 3,264,272 | 8/1966 | Rees | 428/36.9 |
| 3,520,861 | 7/1970 | Thomson et al. | 526/317.1 |
| 3,594,342 | 7/1971 | Ratzch et al. | 524/326 |
| 3,658,741 | 4/1972 | Knutson et al. | 523/309 |
| 3,780,140 | 12/1973 | Hammer | 525/185 |
| 3,884,857 | 5/1975 | Ballard et al. | 523/348 |
| 3,896,065 | 7/1975 | Reardon et al. | 524/446 |
| 4,252,924 | 2/1981 | Chatterjee | 525/329.5 |
| 4,351,931 | 9/1982 | Armitage | 428/461 |
| 4,381,376 | 4/1983 | Albee, Jr. et al. | 525/367 |
| 4,420,580 | 12/1983 | Herman et al. | 524/424 |
| 4,434,261 | 2/1984 | Brugel et al. | 524/515 |
| 4,863,781 | 9/1989 | Kronzer | 428/200 |
| 4,870,128 | 9/1989 | Couturier et al. | 526/318.6 |

*Primary Examiner*—Joseph L. Schofer
*Assistant Examiner*—R. H. Delmendo
*Attorney, Agent, or Firm*—Paul R. Steyermark

[57] ABSTRACT

A composition stabilized against thermal crosslinking and consequent reduction of its melt index, consisting essentially of a uniform dispersion of alumina-coated titanium dioxide pigment in a blend of a matrix polymer which is a dipolymer of ethylene with an ethylenically unsaturated carboxylic acid or a terpolymer of ethylene with an ethylenically unsaturated carboxylic acid and with another ethylenically unsaturated comonomer, or with carbon dioxide or sulfur dioxide, with a stabilizing polymer which is a high melt index copolymer of ethylene with acrylic or methacrylic acid. Such compositions are useful in melt-fabricating white-pigmented articles such as, e.g., toothpaste tubes and condiment pouches.

18 Claims, 1 Drawing Sheet

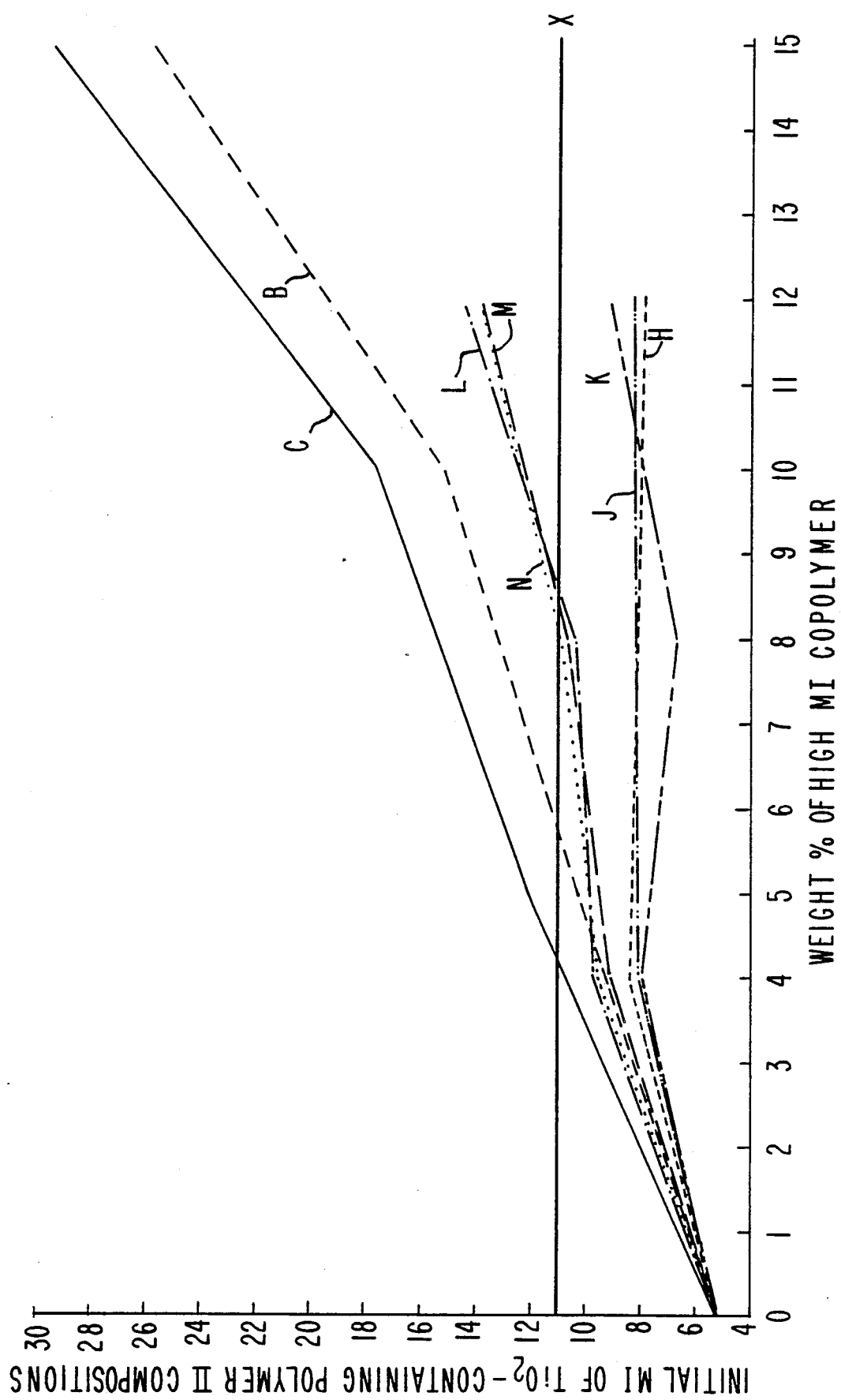

WHITE-PIGMENTED, MELT-STABLE ETHYLENE/CARBOXYLIC ACID COPOLYMER COMPOSITIONS

BACKGROUND OF THE INVENTIO

This invention relates to melt-stable, titanium dioxide-containing copolymers of ethylene with alpha,beta-unsaturated carboxylic acids, which are useful, i.a., in laminated structures such as, e.g., toothpaste tubes, where metal foil is laminated to a printable plastic layer on which the name of the product or other similar information is to be printed. Ethylene copolymers with alpha,beta-unsaturated carboxylic acids are known to be very good hot melt adhesives, which are suitable for bonding the outer layer to the metal foil or to another plastic layer. When the outer layer is a clear or at least translucent plastic, it is considered advantageous from the standpoint of aesthetics and commercial appeal that the adhesive layer be white-pigmented, so that the white color may show through. Another typical application for such white-pigments copolymers is in condiment pouches.

Traditionally, titanium dioxide has been used as white pigment for plastics and for other purposes. However, commercial titanium dioxide particles normally are coated on their surface with alumina, which improves the pigment's flowability. When such alumina-coated titanium dioxide is incorporated into an ethylene/alpha,beta-unsaturated carboxylic acid copolymer, and such pigmented copolymer is exposed to high temperatures, such, for example, as are encountered during extrusion, the copolymer appears to be reacting with the alumina coating, as evidenced by a decrease of the polymer's melt index. Further reduction of melt index occurs on storage. Such lowering of the melt index is undesirable because it leads to nonuniform coating thicknesses and pinholes in the coatings. In addition to the instability of the melt index, a further problem has been the formation of gels in the polymer, resulting in poor quality extrusion coatings.

There is, therefore, a great need for a thermally stable titanium dioxide-pigmented ethylene/alpha,beta-unsaturated carboxylic acid copolymer.

SUMMARY OF THE INVENTION

According to this invention, there is provided a composition stabilized against thermal crosslinking and consequent decrease of its melt index consisting essentially of a uniform dispersion of alumina-coated titanium dioxide pigment in a blend of a matrix polymer with a stabilizing polymer, the matrix polymer being a copolymer represented by the formula E/X/Y, where E stands for ethylene; X stands for a $C_3$-$C_7$ alpha,beta-unsaturated carboxylic acid; and Y, which is optional, stands for another copolymerizable comonomer selected from the group consisting of $C_3$-$C_7$ alpha,beta-unsaturated carboxylic acids, $C_1$-$C_{10}$ alkyl esters of such acids, vinyl esters, vinyl ethers, acrylonitrile, methacrylonitrile, carbon monoxide, and sulfur dioxide; the respective relative weight ratios of the monomers in said E/X/Y copolymer being about 96:4:0 to 40:30:30, and the melt index of said copolymer, determined according to ASTM D1238, Condition E, being about 0.1-100 dg/min; and the stabilizing polymer being a high melt index copolymer of ethylene with an unsaturated carboxylic acid selected from the group consisting of acrylic acid (E/AA copolymer) and methacrylic acid (E/MAA copolymer), said high melt index copolymer having a melt index of at least about 5,000 dg/min, but preferably at least 10,000 dg/min, determined according to ASTM D1238, condition E, and containing at least about 5 weight percent, preferably at least 9 weight percent, of carboxylic acid monomer;

the relative weight ratio of matrix polymer to stabilizing polymer being about 95:5 to 80:20, and the amount of titanium dioxide in the blend being about 5 to 20 weight percent.

The composition may be further compounded to incorporate minor amounts of conventional additives such as, e.g., stabilizers, antioxidants, and slip improving agents. It can be additionally formulated with further additives such as, for example, plasticizers and unreactive fire retardants such as halogenated hydrocarbons, the total amount of plasticizers, if present, being no more than about 15 weight percent, but preferably 5-15 weight percent of the final composition; and the amount of fire retardants, if any, being about 10 to 30 weight percent of the final composition, depending on the level of fire resistance desired.

BRIEF DESCRIPTION OF THE DRAWING

The drawing represents a plot of intitial melt index of representative compositions of the present invention as well as of some compositions outside the scope of the present invention vs. weight percent of high melt index copolymer in those compositions.

DETAILED DESCRIPTION OF THE INVENTION

Definition: For the purpose of the present disclosure and claims, the expression "consisting essentially of" means that the recited components are essential, while smaller amounts of other components may be present to the extent that they do not detract from the operability of the present invention.

The E/X/Y copolymers suitable in the process of the present invention either are available commercially or can be made according to known processes from readily available monomers. Copolymers of ethylene with unsaturated carboxylic acids are described in U.S. Pat. Nos. 4,351,931 to Armitage, 4,252,924 to Chatterjee, 3,264,272 to Rees, 3,520,861 to Thomson et al., 3,884,857 to Ballard et al., and 3,658,741 to Knutson et al. Terpolymers of ethylene with unsaturated carboxylic acids and with alkyl esters of unsaturated carboxylic acids are described in U.S. Pat. No. 3,264,272 to Rees; terpolymers of ethylene with carbon monoxide and unsaturated carboxylic acids are disclosed in U.S. Pat. No. 3,780,140 to Hammer, while terpolymers with sulfur dioxide and unsaturated carboxylic acids are described in U.S. Pat. No. 3,784,140 to Hammer. Various ethylene copolymers with methacrylic acid are sold by E. I. du Pont de Nemours and Company under the trademark NUCREL®. Ethylene copolymers with acrylic acid are sold by Dow Chemical Company under the trademark Primacor®. Carboxylic acids, in addition to acrylic, methacrylic, and higher unsaturated monocarboxylic acids, also include monoesters of alpha,beta-unsaturated dicarboxylic acids such as, e.g., maleic, fumaric, and itaconic acids. Typical alkyl esters of alpha,beta-unsaturated carboxyl acids include methyl, ethyl, butyl, pentyl, hexyl, octyl, and decyl esters, both linear and branched, as well as diesters of dicarboxylic acids.

High melt index copolymers of ethylene with acrylic or methacrylic acid normally will be dipolymers, although a minor amount of a third monomer, such as, for example, one of those that can be present in matrix terpolymers, can be tolerated without impairing the operability of this invention.

High melt index copolymers of ethylene with acrylic acid are available, for example, from Allied Signal Corporation under the trademark A-C® Copolymers. Such copolymers also can be made according to known methods, as illustrated by means of examples herein.

High melt index copolymers of ethylene with methacrylic acid also can be made according to known methods, as illustrated by means of examples herein.

Titanium dioxide is available from several sources, including E. I. du Pont de Nemours and Company.

Preferred matrix dipolymers are dipolymers of ethylene with methacrylic acid (X is methacrylic acid and Y is absent) and especially those in which the weight proportion of methacrylic acid is about 3-30%, preferably 4-15% by weight. Preferred matrix terpolymers are terpolymers of ethylene in which X is methacrylic acid and Y is vinyl acetate, n-butyl acrylate, or isobutyl acrylate.

It is generally preferred to choose the type and amount of the stabilizing polymer such that the resulting initial melt index of the composition is close to the melt index of the matrix polymer itself. As will be seen below, this objective can be met for the preferred compositions with moderate amounts, 15% or less, of stabilizing polymer.

In the practical operation of the present invention, the high melt index stabilizing polymer and titanium dioxide may first be blended in a suitable equipment above the melt temperature of the polymer to form a masterbatch containing about 50-75 weight percent of $TiO_2$ uniformly dispersed in the polymer matrix. This masterbatch is then again melt-blended in the desired proportions with the matrix polymer. As an alternative, all three components may be melt-blended in one step. Neither method appears to offer an advantage over the other.

This invention is now illustrated by the following examples of certain preferred embodiments thereof, where all parts, proportions, and percentages are by weight unless otherwise indicated. $TiO_2$ used in all the examples was a commercial product of E. I. du Pont de Nemours and Company sold under the trademark Ti-Pure® R101. It had an average particle size of 0.18 micrometer and was coated on its surface with aluminum oxide.

Small quantities of material, about 50 g, were melt-compounded using a Haake System 40 Mixer fitted with roller-blade rotors. Samples were prepared for this mixer by dry blending the various powders and pellets and charging the total slowly to the mixer. Unless otherwise noted, the compounds were mixed in the Haake mixer at the required temperature for 3 minutes at 15 RPM, then for 7 minutes at 50 RPM.

Larger quantities of dry blend were compounded on a Werner and Pfleiderer corotating twin screw extruder using either a 28 mm trilobal or a 30 mm bilobal screw configuration.

Melt Index (MI)

Unless otherwise specified, melt index was determined, according to ASTM D1238, condition E, which requires a temperature of 190° C. and a 2,160 g weight.

High MI Copolymers

High MI acid copolymers E through M were prepared according to the general disclosure of U.S. Pat. No. 3,264,272 to Rees. Commercial ethylene and acrylic acid (AA) or methacrylic acid (MAA) were fed in a continuous manner to a stirred pressure vessel. Free radical initiator (t-butyl peroxyacetate) was fed by a separate line. The flow of monomers was adjusted to give constant mole ratios, and the feed rate was the same as the rate of discharge of polymer and of unpolymerized monomers from the reactor. A small amount of acetone or methanol, used as a telogen (chain transfer agent), was also introduced into the reactor with the feed monomers to control the molecular weight.

Table I represents the state of the art of compounding pigmented compositions containing $TiO_2$ and gives melt index stability data for representative compositions containing an E/MAA copolymer as the matrix polymer and a commercial dispersion of titanium dioxide in either an ethylene/methyl acrylate copolymer carrier or a low density polyethylene (LDPE) carrier, both supplied by Ampacet Co. of Mount Vernon, Ill. Samples 1-3 were the matrix polymers, and samples 4 and 5 were the Ampacet $TiO_2$ concentrates. Samples 6 through 11 were made by extruder-blending 25 parts of Ampacet concentrate with 75 parts of matrix polymer at 170° C. The resulting blends had initial MIs of 11.0 to 5.4, but those dropped considerably after mixing at 280° C. in the Haake Mixer. Samples 13 and 14 were made by directly compounding 30 parts of Ampacet concentrates with 70 parts of matrix polymer in the Haake Mixer. The blends had very low MIs, suggesting a rather high degree of crosslinking. Sample 12 was a control, made by direct blending of matrix polymer with $TiO_2$. This sample had a higher MI than samples 13 and 14, which were made via the concentrates.

TABLE I

STATE OF THE ART OF POLYMER/$TiO_2$ COMPOUNDING

| Sample No. | $TiO_2$ Dispers., Polymer, % | Matrix Polymer, % | % $TiO_2$ in Blend | Extruder Mix Temp. | MI | Haake Mix Temp. | MI Init. | MI 1 Mo. | MI 2 Mo. |
|---|---|---|---|---|---|---|---|---|---|
| 1 | — | [a], 100 | — | — | 12.5 | — | — | — | — |
| 2 | — | [b], 100 | — | — | 9.1 | — | — | — | — |
| 3 | — | [c], 100 | — | — | 7.0 | — | — | — | — |
| 4 | [d], 100 | — | — | — | 9.1 | — | — | — | — |
| 5 | [e], 100 | — | — | — | 5.1 | — | — | — | — |
| 6 | [d], 25 | [a], 75 | 12.5 | 170 | 11.0 | 280 | 0.4 | 0.6 | 0.5 |
| 7 | [d], 25 | [b], 75 | 12.5 | 170 | 9.7 | 280 | 2.0 | 2.0 | 2.0 |
| 8 | [d], 25 | [c], 75 | 12.5 | 170 | 7.1 | 280 | 0.8 | 0.8 | 0.8 |
| 9 | [e], 25 | [a], 75 | 12.5 | 170 | 9.1 | 280 | 0.7 | 0.8 | 0.6 |
| 10 | [e], 25 | [b], 75 | 12.5 | 170 | 7.7 | 280 | 2.1 | 2.1 | 2.7 |

TABLE I-continued

STATE OF THE ART OF POLYMER/TiO₂ COMPOUNDING

| Sample No. | TiO₂ Dispers., Polymer, % | Matrix Polymer, % | % TiO₂ in Blend | Extruder Mix Temp. | MI | Haake Mix Temp. | MI Init. | MI 1 Mo. | MI 2 Mo. |
|---|---|---|---|---|---|---|---|---|---|
| 11 | [e], 25 | [c], 75 | 12.5 | 170 | 5.4 | 280 | 0.7 | 0.8 | 0.6 |
| 12 | — | [a], 85 | 15.0 | — | — | 280 | 1.2 | 1.5 | 1.4 |
| 13 | [e], 30 | [a], 70 | 15.0 | — | — | 280 | 1.0 | 0.8 | 0.7 |
| 14 | [d], 30 | [a], 70 | 15.0 | — | — | 280 | 0.4 | 0.5 | 0.5 |

[a] E/MAA copolymer, 9% MAA, nominal MI = 10
[b] E/MAA copolymer, 6% MAA, nominal MI = 9
[c] E/MAA copolymer, 4% MAA, nominal MI = 7
[d] "Ampacet" 11892: 50% TiO₂, E/Methyl acrylate carrier, nominal blend MI = 12
[e] "Ampacet" 11171: 50% TiO₂, LDPE carrier, nominal blend MI = 5

Tables II and III describe the various copolymers used in the course of the experimental work reported herein.

Table II lists the matrix copolymers, and Table III lists the high melt index stabilizing E/AA and E/MAA copolymers. The matrix copolymers are identified by Roman numerals I through IV. High melt index stabilizing copolymers are designated by letters A–G. Those

TABLE II

ETHYLENE/METHACRYLIC ACID MATRIX COPOLYMERS

|  | I | II |
|---|---|---|
| Acid Content (%) | 9.0 | 4.0 |
| Melt Index (dg/min) | 10 | 11 |

TABLE III

HIGH MI COPOLYMERS

|  | A* | B* | C* | D* | E | F |
|---|---|---|---|---|---|---|
| Acid Type | AA | AA | AA | AA | MAA | AA |
| Acid Content (%)** | 5.0 | 9.1 | 15.6 | 23.8 | 22.0 | 18.1 |
| Meq/g | 0.69 | 1.26 | 2.17 | 3.31 | 2.59 | 2.51 |
| Melt Index |  |  |  |  |  |  |
| Literature | >15,000 | >15,000 | >15,000 | >15,000 | — | — |
| Determined | — | — | — | — | 12200 | >10000 |
| GPC Data |  |  |  |  |  |  |
| Peak MW | 8160 | 6850 | 4590 | 1800 | 3130 | 2740 |
| Mw | 10400 | 8820 | 5670 | 2860 | 3720 | 3190 |
| Mv | 9610 | 8040 | 5100 | 2460 | 3360 | 2900 |
| Mn | 5470 | 3420 | 2040 | 960 | 1450 | 1330 |
| Mw/Mn | 1.90 | 2.58 | 2.78 | 2.97 | 2.56 | 2.41 |
| Intr. Visc. | 0.16 | 0.155 | 0.115 | 0.124 | 0.155 | 0.139 |

|  | G | H | J | K | L | M | N | P |
|---|---|---|---|---|---|---|---|---|
| Acid Type | AA | AA | AA | AA | MAA | MAA | MAA | MAA |
| Acid Content (%)** | 29.7 | 18.1 | 24.5 | 29.5 | 22.4 | 28.6 | 34.6 | 11.0 |
| Meq/g | 4.13 | 2.51 | 3.40 | 4.10 | 2.64 | 3.36 | 4.07 | 1.29 |
| Melt Index |  |  |  |  |  |  |  |  |
| Literature | — | — | — | — | — | — | — | 100 |
| Determined | 10000 | 2400 | 1750 | 1200 | 1120 | 1000 | 1100 | — |
| GPC Data |  |  |  |  |  |  |  |  |
| Peak MW | 2350 | 7720 | 6910 | 5210 | 7850 | 6850 | 4170 | N/D |
| Mw | 3120 | 9800 | 8210 | 6420 | 9950 | 7690 | 5660 | N/D |
| Mv | 2810 | 8870 | 7360 | 5760 | 8960 | 6940 | 5040 | N/D |
| Mn | 1200 | 3480 | 2730 | 2090 | 3570 | 2690 | 1890 | N/D |
| Mw/Mn | 2.60 | 2.82 | 3.01 | 3.07 | 2.79 | 2.86 | 2.99 | N/D |
| Intr. Visc. | 0.136 | 0.313 | 0.274 | 0.229 | 0.315 | 0.262 | 0.208 | N/D |

*"A–C" resins from Allied-Signal Co.
**By titration designated H and J–P have melt indices below 5,000 dg/min and are outside the scope of the present invention; they are included for comparison purposes only. Gel permeation chromatography data reported in Table III were obtained using Waters HPLC 150, AT-80M/S columns Numbers 7J732 and 7G707, with trichlorobenzene as solvent, at a temperature of 135° C. The intrinsic viscosities were calculated using the Mark-Houwink equation with k=0.0004340 and alpha=0.724.

Table IV lists representative pigmented compositions obtained from matrix polymer I by compounding at 280° C. with varying amounts of high MI copolymers. Samples 15–18, 33, and 41 were controls containing no high MI copolymer. Samples 15–32 contained 15% of TiO₂; samples 33–40 contained 9% of TiO₂; and samples 41–42 contained 8% of TiO₂. Samples 8–40 are outside the scope of the invention. These data show that with increasing level of high MI copolymer the initial MI increased, and MI stability improved.

TABLE IV

PIGMENTED COMPOSITIONS BASED ON MATRIX POLYMER I COMPOUNDED AT 280° C.

| Sample No. | High MI Copolymer, % | | Matrix Polymer, % | TiO2 | MI Initial | 2 Wk. | 1 Mo. | 2 Mo. |
|---|---|---|---|---|---|---|---|---|
| 15 | — | | 85 | 15 | 2.5 | 2.4 | 2.7 | 2.3 |
| 16 | — | | 85 | 15 | 1.4 | 1.5 | 1.3 | 1.3 |
| 17 | — | | 85 | 15 | 1.4 | — | — | — |
| 18 | — | | 85 | 15 | 1.6 | 1.8 | — | — |
| 19 | A, | 2 | 83 | 15 | 2.2 | 2.7 | 2.2 | 2.2 |
| 20 | A, | 5 | 80 | 15 | 2.2 | 2.7 | 2.6 | 2.7 |
| 21 | A, | 10 | 75 | 15 | 4.1 | 4.4 | 4.0 | 3.2 |
| 22 | A, | 15 | 70 | 15 | 8.2 | 7.3 | 7.0 | 6.7 |
| 23 | B, | 2 | 83 | 15 | 1.6 | 1.6 | 1.6 | 1.5 |
| 24 | B, | 5 | 80 | 15 | 2.1 | 2.2 | 2.7 | 1.8 |
| 25 | B, | 10 | 75 | 15 | 5.1 | 5.5 | 4.9 | 5.2 |
| 26 | B, | 15 | 70 | 15 | 9.1 | 10.0 | 8.6 | 9.0 |
| 27 | C, | 2 | 83 | 15 | 2.2 | 2.4 | 2.7 | 2.4 |
| 28 | C, | 5 | 80 | 15 | 3.1 | 3.9 | 3.4 | 3.8 |
| 29 | C, | 7.5 | 77.5 | 15 | 6.0 | 6.4 | 6.0 | — |
| 30 | C, | 10 | 75 | 15 | 7.6 | 8.0 | 7.0 | 7.7 |
| 31 | C, | 10 | 75 | 15 | 7.9 | 8.8 | — | — |
| 32 | C, | 15 | 70 | 15 | 16.4 | — | 15.4 | 15.1 |
| 33 | — | | 91 | 9 | 4.1 | 4.0 | 3.9 | 4.1 |
| 34 | C, | 3 | 88 | 9 | 5.7 | 6.2 | 6.2 | 6.8 |
| 35 | C, | 5 | 86 | 9 | 6.4 | 6.9 | 7.9 | 8.7 |
| 36 | C, | 8 | 83 | 9 | 11.5 | 11.5 | 12.1 | 10.8 |
| 37 | C, | 10 | 81 | 9 | 14.0 | 14.9 | 15.0 | 12.2 |
| 38 | P, | 5 | 86 | 9 | 4.9 | 5.2 | 5.5 | 5.3 |
| 39 | P, | 10 | 81 | 9 | 5.8 | 5.6 | 6.2 | 6.6 |
| 40 | P, | 15 | 76 | 9 | 6.0 | 6.1 | 6.5 | 5.3 |
| 41 | — | | 92 | 8 | 3.7 | 4.1 | — | 4.2 |
| 42 | C, | 4 | 88 | 8 | 7.1 | 7.2 | — | 7.0 |

Table V similarly lists representative pigmented compositions obtained from matrix polymer II. Here, samples 43–55 contained 15% of TiO2; samples 56–63 contained 9% of TiO2; and samples 64–69 contained 6% of TiO2. Samples 43 and 56 were controls. The same general observation can be made that a higher level of high MI copolymer increased both the MI and the MI stability of the pigmented compositions.

The drawing is a plot comparing the effectiveness of representative high MI copolymers in increasing the initial MI of TiO2-containing matrix polymer II compositions. It shows the superiority of copolymers B and C, which had MI's in excess of 15,000, over copolymers H, J, K, L, and M, which had MI's from 2400 to 1000. The melt indices of the compositions containing copolymers B and C were higher initially and increased dramatically with the level of the copolymers B or C, while they were lower initially for copolymers H through L and either increased to a much lesser degree or not at all with increasing levels of those copolymers.

TABLE V

PIGMENTED COMPOSITIONS CONTAINING MATRIX POLYMER II COMPOUNDED AT 280° C.

| Sample No. | High MI Copolymer, % | | Matrix Polymer, % | TiO2 | MI Initial | 2 Wk. | 1 Mo. | 2 Mo. |
|---|---|---|---|---|---|---|---|---|
| 43 | — | | 85 | 15 | 5.2 | 4.8 | 5.3 | — |
| 44 | B | 5 | 80 | 15 | 10.3 | 9.7 | 9.3 | 9.5 |
| 45 | B | 6 | 79 | 15 | 11 | 10.5 | 10.5 | 11.5 |
| 46 | B | 10 | 75 | 15 | 15.2 | 16.3 | 16.6 | 16.5 |
| 47 | B | 15 | 70 | 15 | 23.9 | 25.7 | 25.2 | 27.1 |
| 48 | C | 4.5 | 80.5 | 15 | 11.2 | 11.1 | 10.9 | 11.3 |
| 49 | C | 5 | 80 | 15 | 12.1 | 12.9 | 12.1 | — |
| 50 | C | 10 | 75 | 15 | 17.6 | 17.6 | 16.6 | — |
| 51 | C | 15 | 70 | 15 | 29.5 | 29.1 | 30.8 | — |
| 52 | D | 2.0 | 83 | 15 | 9.1 | — | 9.5 | 9.3 |
| 53 | D | 4.0 | 81 | 15 | 10.1 | — | 10.1 | 10.6 |
| 54 | D | 6.0 | 79 | 15 | 10.7 | — | 10.9 | 11.3 |
| 55 | D | 8.0 | 77 | 15 | 12.9 | — | 13.3 | 14.3 |
| 56 | — | | 91 | 9 | 7.3 | 6.9 | 7.0 | — |
| 57 | B | 5 | 86 | 9 | 10.9 | 10.7 | 12.6 | 11.6 |
| 58 | B | 5 | 86 | 9 | 11.5 | 11.2 | 11.6 | 12.3 |
| 59 | B | 10 | 81 | 9 | 19.4 | 18.1 | 18.1 | 18.8 |
| 60 | B | 15 | 76 | 9 | 27.7 | 27.2 | 26.3 | 26.8 |
| 61 | C | 3.5 | 87.5 | 9 | 10.7 | 11.7 | 11.5 | 11.8 |
| 62 | C | 3 | 88 | 9 | 10.5 | 11.6 | 12.4 | — |
| 63 | C | 8 | 83 | 9 | 15.8 | 16.5 | 16.2 | — |
| 64 | B | 2 | 92 | 6 | 9.3 | 10.1 | 9.0 | 9.1 |
| 65 | B | 4 | 90 | 6 | 10.4 | 11.6 | 11.2 | 10.5 |
| 66 | B | 6 | 88 | 6 | 13.6 | 13.1 | 13.3 | 13.2 |
| 67 | C | 2 | 92 | 6 | 8.7 | 9.5 | 8.3 | 9.0 |
| 68 | C | 4 | 90 | 6 | 11.5 | 12.2 | 11.9 | 11.7 |

TABLE V-continued

PIGMENTED COMPOSITIONS CONTAINING
MATRIX POLYMER II COMPOUNDED AT 280° C.

| Sample No. | High MI Copolymer, % | | Matrix Polymer, % | TiO₂ | MI | | | |
|---|---|---|---|---|---|---|---|---|
| | | | | | Initial | 2 Wk. | 1 Mo. | 2 Mo. |
| 69 | C | 6 | 88 | 6 | 13.1 | 14.1 | 13.4 | 14.0 |

Table VI presents data correlating the melt invention, with the melt index stability of the All the blends were prepared on the Haake System 40 Mixer at 280° C. All the copolymers in this table had MI's between 1000 and 2400 dg/min but this still was not high enough for optimum effectiveness. It can be seen, for example, that while the MI's were reasonably stable, increasing the amount of the high MI copolymer did not in most cases significantly increase the MI of the blend.

Table VII presents similar data as Table VI, except that all the high MI copolymers have MIs of at least 10,000. In this case, both high MIs and high MI stabilities are obtained for the blends; and, further, increase of the level of high MI copolymer considerably increases the MI of the resulting blend. For example, sample 113 in this table was of the same composition as sample 92 in Table VI. Yet, at same level of high MI copolymer, the blend MI in the former case was 10.2, but in the latter case it was only 7.6.

TABLE VI

STABILIZATION OF MELT
INDEX WITH HIGH MI COPOLYMERS

| Sample No. | High MI Copolymer, % | | Matrix Polymer, % | | % TiO₂ | Melt Index | | |
|---|---|---|---|---|---|---|---|---|
| | | | | | | Initial | 2 Wk. | 1 Mo. |
| 70 | H | 6 | I | 79 | 15 | 5.0 | 5.5 | 5.8 |
| 71 | H | 9 | I | 76 | 15 | 5.6 | 6.3 | 5.9 |
| 72 | H | 12 | I | 73 | 15 | 5.7 | 5.8 | 6.4 |
| 73 | H | 4 | II | 81 | 15 | 8.4 | 9.0 | 8.5 |
| 74 | H | 8 | II | 77 | 15 | 8.1 | 8.3 | 8.7 |
| 75 | H | 12 | II | 73 | 15 | 7.9 | 8.1 | 8.3 |
| 76 | J | 3 | I | 82 | 15 | 4.4 | 4.1 | 4.6 |
| 77 | J | 6 | I | 79 | 15 | 5.1 | 6.0 | 5.1 |
| 78 | J | 9 | I | 76 | 15 | 4.9 | 6.0 | 5.4 |
| 79 | J | 12 | I | 73 | 15 | 5.1 | 5.7 | 5.3 |
| 80 | J | 4 | II | 81 | 15 | 8.1 | 8.3 | 8.6 |
| 81 | J | 8 | II | 77 | 15 | 8.2 | 8.4 | 8.6 |
| 82 | J | 12 | II | 73 | 15 | 8.3 | 8.5 | 8.8 |
| 83 | K | 3 | I | 82 | 15 | 5.5 | 4.3 | 6.0 |
| 84 | K | 6 | I | 79 | 15 | 3.7 | 5.8 | 6.1 |
| 85 | K | 9 | I | 76 | 15 | 4.9 | 4.7 | 6.3 |
| 86 | K | 12 | I | 73 | 15 | 4.8 | 4.2 | 4.9 |
| 87 | K | 4 | II | 81 | 15 | 8.0 | 7.7 | 7.5 |
| 88 | K | 8 | II | 77 | 15 | 6.7 | 7.5 | 7.1 |
| 89 | K | 12 | II | 73 | 15 | 9.2 | 8.3 | 9.1 |
| 90 | L | 3 | I | 82 | 15 | 5.7 | 4.8 | 5.7 |
| 91 | L | 6 | I | 79 | 15 | 6.5 | 7.4 | 7.4 |
| 92 | L | 9 | I | 76 | 15 | 7.6 | 8.7 | 8.7 |
| 93 | L | 12 | I | 73 | 15 | 8.4 | 8.6 | 9.6 |
| 94 | L | 4 | II | 81 | 15 | 9.7 | 9.5 | 9.9 |
| 95 | L | 8 | II | 77 | 15 | 10.4 | 10.7 | 11.2 |
| 96 | L | 12 | II | 73 | 15 | 14.5 | 16.1 | 14.3 |
| 97 | M | 3 | I | 82 | 15 | 4.3 | 5.0 | 3.8 |
| 98 | M | 6 | I | 79 | 15 | 6.2 | 6.1 | 7.0 |
| 99 | M | 9 | I | 76 | 15 | 7.7 | 7.7 | 7.5 |
| 100 | M | 12 | I | 73 | 15 | 7.7 | 10.1 | 11.8 |
| 101 | M | 4 | II | 81 | 15 | 9.1 | 9.5 | 10.0 |
| 102 | M | 8 | II | 77 | 15 | 10.7 | 11.1 | 10.8 |
| 103 | M | 12 | II | 73 | 15 | 13.9 | 14.5 | 13.9 |
| 104 | N | 3 | I | 82 | 15 | 5.1 | 5.5 | 5.7 |
| 105 | N | 6 | I | 79 | 15 | 5.9 | 6.2 | 7.1 |
| 106 | N | 9 | I | 76 | 15 | 7.2 | 8.3 | 5.7 |
| 107 | N | 12 | I | 73 | 15 | 6.1 | 8.0 | 7.0 |
| 108 | N | 4 | II | 81 | 15 | 9.5 | 8.9 | 8.9 |
| 109 | N | 8 | II | 77 | 15 | 10.9 | 11.8 | 10.5 |
| 110 | N | 12 | II | 73 | 15 | 13.9 | 12.7 | 12.1 |

TABLE VII

STABILIZATION OF MELT
INDEX WITH HIGH MI COPOLYMERS

| Sample No. | High MI Copolymer, % | | Matrix Polymer, % | | % TiO₂ | Melt Index | | | |
|---|---|---|---|---|---|---|---|---|---|
| | | | | | | Init. | 2 Wk. | 1 Mo. | 2 Mo. |
| 111 | E | 3 | I | 82 | 15 | 3.7 | 3.0 | 2.6 | 2.9 |
| 112 | E | 6 | I | 79 | 15 | 6.4 | 7.1 | 6.4 | 5.3 |
| 113 | E | 9 | I | 76 | 15 | 10.2 | 10.8 | 8.8 | 10.2 |
| 114 | E | 12 | I | 73 | 15 | 13.5 | 14.4 | 13.5 | 14.4 |
| 115 | E | 4 | II | 81 | 15 | 12.1 | 12.7 | 11.7 | 11.2 |

TABLE VII-continued
STABILIZATION OF MELT INDEX WITH HIGH MI COPOLYMERS

| Sample No. | High MI Copolymer, % | | Matrix Polymer, % | | % TiO$_2$ | Melt Index | | | |
|---|---|---|---|---|---|---|---|---|---|
| | | | | | | Init. | 2 Wk. | 1 Mo. | 2 Mo. |
| 116 | E | 8 | II | 77 | 15 | 14.6 | 14.2 | 12.9 | 13.7 |
| 117 | E | 12 | II | 73 | 15 | 21.0 | 21.2 | 20.4 | 19.9 |
| 118 | F | 3 | I | 82 | 15 | 2.3 | 3.9 | 2.6 | — |
| 119 | F | 6 | I | 79 | 15 | 5.6 | 5.9 | 7.5 | — |
| 120 | F | 9 | I | 76 | 15 | 9.0 | 9.1 | 10.2 | — |
| 121 | F | 12 | I | 73 | 15 | 12.0 | 12.4 | 12.3 | — |
| 122 | F | 4 | II | 81 | 15 | 11.1 | 10.9 | 10.2 | — |
| 123 | F | 8 | II | 77 | 15 | 14.0 | 13.4 | 13.3 | — |
| 124 | F | 12 | II | 73 | 15 | 17.6 | 18.0 | 18.7 | — |
| 125 | G | 3 | I | 82 | 15 | 3.0 | 4.9 | 5.2 | — |
| 126 | G | 6 | I | 79 | 15 | 6.4 | 7.8 | 7.4 | — |
| 127 | G | 9 | I | 76 | 15 | 8.4 | 9.6 | 7.6 | — |
| 128 | G | 12 | I | 73 | 15 | 11.2 | 11.7 | 12.4 | — |
| 129 | G | 4 | II | 81 | 15 | 9.7 | 10.3 | 10.2 | — |
| 130 | G | 8 | II | 77 | 15 | 13.5 | 13.2 | 14.1 | — |
| 131 | G | 12 | II | 73 | 15 | 16.5 | 17.2 | 17.3 | — |

Table VIII summarizes the preparation of TiO$_2$ concentrates for the practice of this invention.

Samples 132-138 were prepared using the Haake System 40 Mixer. Those compositions were then scaled up on a 30 mm twin screw extruder. Comparison of the initial MIs of samples 132 and 139 and samples 133 and 140 shows good initial MI reproducibility on scale-up. Table IX is a continuation of the experiments reported in Table VIII. All the compositions were compounded using a Haake System 40 Mixer. Table IX demonstrates that the invention can be practiced in two steps, using TiO$_2$ concentrates, to the same extent as by blending individual components in a one-step operation. The concentrates were blended with either Matrix Polymer I or Matrix Polymer II in such amounts that the resulting blends contained either 9% or 15% of TiO$_2$. The initial MIs of the final blends were comparable to those of the corresponding single-step preparations, which MIs are given in square brackets.

TABLE VIII
PIGMENTED COMPOSITIONS PREPARED USING CONCENTRATES
PART A
Blended in the Haake Mixer

| Sample No. | High MI Copolymer, % | | Matrix Polymer, % | | TiO$_2$, % | Melt Temp. | Initial Melt Index | |
|---|---|---|---|---|---|---|---|---|
| 132 | C | 35.0 | I | 15 | 50 | 200 | 427 | |
| 133 | C | 21.7 | I | 48.3 | 30 | 170 | 55 | |
| 134 | B | 50.0 | | — | 50 | 170 | — | |
| 135 | C | 30.0 | II | 20 | 50 | 170 | 836 | |
| 136 | C | 11.7 | II | 58.3 | 30 | 170 | 25 | |
| 137 | B | 20.0 | II | 30 | 50 | 170 | 47 | |
| 138 | B | 16.7 | II | 53.3 | 30 | 170 | 30 | |
| Extruded on 30 mm twin screw extruder | | | | | | | | |
| 139 | C | 35.0 | I | 15 | 50 | 170 | 650 | same as 132 |
| 140 | C | 21.7 | I | 48.3 | 30 | 170 | 57 | same as 133 |
| 141 | B | 50.0 | | — | 50 | 170 | too liquid to be extruded, | same as 134 |
| 142 | C | 16.7 | II | 33.3 | 50 | 170 | 86 | — |
| 143 | C | 11.7 | II | 58.3 | 30 | 170 | 22 | same as 136 |
| 144 | B | 20.0 | II | 30 | 50 | 170 | 27 | same as 137 |
| 145 | B | 16.7 | II | 53.3 | 30 | 170 | 30 | same as 138 |

TABLE IX
PIGMENTED COMPOSITIONS PREPARED USING CONCENTRATES
PART B

| Sample No. | Concentrate Sample No., % | | Matrix Polymer, % | Melt Temp | Melt Index | | | |
|---|---|---|---|---|---|---|---|---|
| | | | | | Init.* | 2 Wk. | 1 Mo. | 2 Mo. |
| 146 | 132 | 30 | I | 70 | 280 | 10.3 [9.2] | 10.1 | 8.8 | 10.3 |
| Gives 10.5% High MI Copolymer C + 74.5% Matrix Copolymer I + 15% TiO$_2$ | | | | | | | | | |
| 147 | 133 | 30 | I | 70 | 280 | 8.4 [8.2] | 9.5 | 8.1 | 9.5 |
| Gives 6.5% High MI Copolymer C + 84.5% Matrix Copolymer I + 9% TiO$_2$ | | | | | | | | | |
| 148 | 134 | 30 | I | 70 | 280 | 9.8 [8.3] | 10.0 | 9.0 | 9.2 |
| Gives 15% High MI Copolymer B + 70% Matrix Copolymer I + 15% TiO$_2$ | | | | | | | | | |
| 149 | 135 | 30 | II | 70 | 280 | 15.5 | 17.1 | 16.1 | 16.4 |
| Gives 9% High MI Copolymer C + 76% Matrix Copolymer II + 15% TiO$_2$ | | | | | | | | | |
| 150 | 136 | 30 | II | 70 | 280 | 12.4 [10.7] | 12.9 | 12.5 | 12.5 |
| Gives 3.5% High MI Copolymer C + 87.5% Matrix Copolymer II + 9% TiO$_2$ | | | | | | | | | |
| 151 | 137 | 30 | II | 70 | 280 | 8.9 | 9.7 | 11.0 | 9.8 |

TABLE IX-continued
PIGMENTED COMPOSITIONS PREPARED USING CONCENTRATES
PART B

| Sample No. | Concentrate Sample No., % | | Matrix Polymer, % | Melt Temp | Melt Index Init.* | 2 Wk. | 1 Mo. | 2 Mo. |
|---|---|---|---|---|---|---|---|---|
| | | | | | [11.0] | | | |
| Gives 6% High MI Copolymer B + 79% Matrix Copolymer II + 15% TiO₂ | | | | | | | | |
| 152 | 138 | 30 | II  70 | 280 | 12.5 | 13.5 | 13.5 | 11.9 |
| | | | | | [8.1] | | | |
| Gives 5% High MI Copolymer B + 86% Matrix Copolymer II + 9% TiO₂ | | | | | | | | |
| 153 | 139 | 30 | I  70 | 280 | 8.0 | 9.0 | — | 9.0 |
| | | | | | [10.3] | | | |
| Gives 10.5% High MI Copolymer C + 74.5% Matrix Copolymer I + 15% TiO₂ | | | | | | | | |
| 154 | 140 | 30 | I  70 | 280 | 5.8 | 7.1 | — | 7.8 |
| | | | | | [8.4 for 147] | | | |
| Gives 6.5% High MI Copolymer C" + 84.5% Matrix Copolymer I + 9% TiO₂ | | | | | | | | |
| 155 | 142 | 30 | II  70 | 280 | 11.4 | 12.5 | — | 12.3 |
| Gives 5% High MI Copolymer C + 80% Matrix Copolymer II + 15% TiO₂ | | | | | | | | |
| 156 | 143 | 30 | II  70 | 280 | 10.4 | 9.6 | — | 11.2 |
| | | | | | [12.4] | | | |
| Gives 3.5% High MI Copolymer C + 87.5% Matrix Copolymer II + 9% TiO₂ | | | | | | | | |
| 157 | 144 | 30 | II  70 | 280 | 10.4 | 11.4 | — | 11.1 |
| | | | | | [8.9] | | | |
| Gives 6% High MI Copolymer B + 79% Matrix Copolymer II + 15% TiO₂ | | | | | | | | |
| 158 | 145 | 30 | II  70 | 280 | 11.9 | 10.1 | — | 12.3 |
| | | | | | [12.5] | | | |
| Gives 5% High MI Copolymer B + 86% Matrix Copolymer II + 9% TiO₂ | | | | | | | | |

*Number in square brackets is the MI of the corresponding blend prepared from the same components in one step, without using a concentrate

I claim:

1. A composition stabilized against thermal crosslinking and consequent reduction of its melt index, consisting esentially of a uniform dispersion of alumina-coated titanium dioxide pigment in a blend of a matrix polymer with a stabilizing polymer,
    the matrix polymer being a copolymer represented by the formula E/X/Y, where E stands for ethylene; X stands for a $C_3$–$C_7$ alpha,beta-unsaturated carboxylic acid; and Y, which is optional, stands for another copolymerizable comonomer selected from the group consisting of $C_3$–$C_7$ alpha,beta-unsaturated carboxylic acids, $C_{1-10}$ alkyl esters of such acids, vinyl esters, vinyl ethers, acrylonitrile, methacrylonitrile, carbon monoxide, and sulfur dioxide; the respective relative weight ratios of the monomers in said E/X/Y copolymer being about 96:4:0 to 40:30:30, and the melt index of said copolymer, determined according to ASTM D1238, Condition E, being about 0.1–100 dg/min; and
    the stabilizing polymer being a high melt index copolymer of ethylene with an unsaturated carboxylic acid selected from the group consisting of acrylic acid (E/AA copolymer) and methacrylic acid (E/MAA copolymer), said high melt index copolymer having a melt index of at least about 5,000 dg/min, determined according to ASTM D1238, condition E, and containing at least about 5 weight percent of carboxylic acid monomer;
    the relative weight ratio of matrix polymer to stabilizing polymer being about 95:5 to 80:20, and the amount of titanium dioxide in the blend being about 5 to 20 weight percent.

2. A composition of claim 1 wherein the melt index of the high melt index copolymer is at least 10,000 dg/min.

3. A composition of claim 1 wherein the amount of carboxylic acid monomer in the high melt index copolymer is at least 9 weight percent.

4. A composition of claim 2 wherein the amount of carboxylic acid monomer in the high melt index copolymer is at least 9 weight percent.

5. A composition of claim 1 which is further compounded to incorporate minor amounts of one or more additives selected from the group consisting of stabilizers, antioxidants, and slip improving agents.

6. A composition of claim 5 which is additionally formulated with one or more additives selected from the group consisting of plasticizers and fire retardants, the total amount of plasticizers, if present, being no more than about 15 weight percent of the final composition; and the amount of fire retardants, if present, being about 10 to 30 weight percent of the final composition.

7. A composition of claim 1 wherein the E/X/Y copolymer is a dipolymer of ethylene with methacrylic acid, wherein methacrylic acid is present in an amount of 3–30 weight percent, and Y is present in an amount of 0 weight percent.

8. A composition of claim 7 wherein the amount of methacrylic acid is 4–15 weight percent.

9. A composition of claim 2 wherein the E/X/Y copolymer is a dipolymer of ethylene with methacrylic acid, wherein methacrylic acid is present in an amount of 3–30 weight percent, and Y is present in an amount of 0 weight percent.

10. A composition of claim 9 wherein the amount of methacrylic acid is 4–15 weight percent.

11. A composition of claim 1 wherein the E/X/Y copolymer is a dipolymer of ethylene with acrylic acid, wherein acrylic acid is present in an amount of 3–30 weight percent, and Y is present in an amount of 0 weight percent.

12. A composition of claim 1 wherein the E/X/Y copolymer is a terpolymer of ethylene in which X is methacrylic acid, and Y is selected from the group consisting of vinyl acetate, n-butyl acrylate, and isobutyl acrylate.

13. A composition of claim 1 wherein the E/X/Y copolymer is a terpolymer of ethylene in which X is acrylic acid, and Y is selected from the group consisting of vinyl acetate, n-butyl acrylate, and isobutyl acrylate.

14. A composition of claim 1 which is prepared by blending all the ingredients together in one step.

15. A composition of claim 1 which is prepared by blending E/X/Y copolymer with a concentrated dispersion of titanium dioxide in high melt index copolymer of ethylene with an unsaturated carboxylic acid.

16. A composition of claim 15 wherein the concentrated dispersion contains about 50–75 weight percent of titanium dioxide.

17. A composition of claim 2 which is prepared by blending E/X/Y copolymer with a concentrated dispersion of titanium dioxide in high melt index copolymer of ethylene with an unsaturated carboxylic acid.

18. A composition of claim 15 wherein the cibcebtrated dispersion contains about 50–75 weight percent of titanium dioxide.

* * * * *

UNITED STATES PATENT AND TRADEMARK OFFICE
CERTIFICATE OF CORRECTION

PATENT NO.   : 4,992,486
DATED        : February 12, 1991
INVENTOR(S)  : Stewart C. Feinberg It is certified that error appears in the above—identified patent and that said Letters Patent is hereby corrected as shown below:

Column 9, line 9, after "melt" and before "invention," add the following -- index of lower MI copolymers, outside the scope of the --.

Column 9, line 10, after "stability of the" add -- blends. --.

Claim 1, Column 13, line 40, "$C_1-_{10}$" should be -- $C_1-C_{10}$ --.

Claim 18, Column 16, line 4, "cibceb" should be -- concen --.

Signed and Sealed this

Fourth Day of August, 1992

Attest:

DOUGLAS B. COMER

*Attesting Officer*        *Acting Commissioner of Patents and Trademarks*